United States Patent [19]

Keathley

[11] Patent Number: 4,893,755
[45] Date of Patent: Jan. 16, 1990

[54] PESTICIDE SPRAYING APPARATUS

[76] Inventor: J. Phillip Keathley, 25330 S. Ruess Rd., Ripon, Calif. 95366

[21] Appl. No.: 265,267

[22] Filed: Oct. 31, 1988

[51] Int. Cl.$^4$ .......................... B05B 5/00; B05B 1/20; B05B 15/04
[52] U.S. Cl. .................................. 239/696; 239/167; 239/172; 239/288; 47/1.7
[58] Field of Search ............. 239/161, 172, 288–288.5, 239/690, 695, 696, 704; 47/1 R, 1.5, 1.7, 27, 48.5

[56] References Cited

U.S. PATENT DOCUMENTS

| 1,669,435 | 5/1928 | Wheeler | 239/288 |
| 2,977,715 | 4/1961 | Lindsay | 47/1.7 |
| 4,186,879 | 2/1980 | Kinder | 239/172 |
| 4,542,855 | 9/1985 | Stacey | 239/690 |

FOREIGN PATENT DOCUMENTS

| 3207645 | 9/1982 | Fed. Rep. of Germany | 47/1.7 |
| 2606672 | 5/1988 | France | 239/288 |

Primary Examiner—Andres Kashnikow
Assistant Examiner—Karen B. Merritt
Attorney, Agent, or Firm—Mark C. Jacobs

[57] ABSTRACT

Pesticide spraying apparatus for spraying crops in the field, grapes, and seedling trees. The spraying apparatus includes a wheeled arcuate canopy open at the bottom providing a rounded arcuate interior wall and a spacing at the open bottom related to the width of one or more conventional rows of crops of the like. The canopy has an arcuate peripheral flange at each end and a downwardly extending skirt or air curtain along the bottom of each side of the canopy to confine the pesticides to the open bottom area of the spraying apparatus. One or more blowers and pesticide assembly is provided for blowing droplets along the interior inner wall of the canopy at spaced locations. An air door or curtain is also created at each open end of the canopy and droplets of pesticide are thus blown into contact with the plants to treat the same under the canopy.

10 Claims, 4 Drawing Sheets

PESTICIDE SPRAYING APPARATUS

BACKGROUND OF THE INVENTION

1. Field of the Invention

The invention relates to pesticide spraying apparatus; and, more particularly, to spraying apparatus for dispersing very small droplets of pesticide in a confined area.

2. Description of the Prior Art

Sprayers for spraying pesticides out in the field are well known in the art. In such sprayers, it is desirable to spray very small droplets of pesticides since such droplets of pesticides are more efficient in killing pests as they penetrate every nook and cranny of the crops being sprayed. The smaller the droplets, the less amount of pesticide needed. This is quite important as to both the cost of such pesticides and concern for the environment.

Prior art devices are known for producing such fine spray of droplets, but have been inefficient in confining the spray to the crops being sprayed and not releasing the spray to the environment. It is important that the wind be prevented from blowing the spray away from the plants being sprayed until the pesticides work to kill the pests on the plants. The longer the spray is confined to the plants, the greater chance the pesticide droplets have of impinging on the target pests. Another important reason for confining the spray is that heat from the soil surface being sprayed normally causes convection currents carrying small droplets along the currents to pollute the environment.

There is thus a need for a sprayer that is highly effective in controlling pests using a smaller amount of pesticides than conventional sprayers and therefore with less pollution to the environment.

SUMMARY OF THE INVENTION

It is an object of this invention to provide improved pesticide spraying apparatus for treating crops and the like while confining the pesticides to the area being treated.

It is a further object of this invention to carry out the foregoing object using less pesticides to treat crops or the like than normally used in conventional spraying devices.

It is still another object of the invention to provide such apparatus which can be quickly and easily coupled to a conventional tractor, then used to spray crops, grape vines, seedling trees, etc., the area covered by the apparatus being variable to accommodate furrows of varying widths.

These and other objects are preferably accomplished by provided a wheeled arcuate canopy open at the bottom providing a rounded arcuate interior wall and a spacing at the open bottom related to the width of a conventional row of crops or the like. The canopy has an arcuate peripheral flange at each end and a downwardly extending skirt or air curtain along the bottom of each side of the canopy to confine the pesticides to the open bottom area of the spraying apparatus. A blower and pesticide dispensing assembly is provided for blowing droplets along the interior inner wall of the canopy at spaced locations. An air door or curtain is also created at each open end of the canopy and droplets of pesticide are thus blown into contact with the plants to treat the same under the canopy to keep the pesticide confined.

DESCRIPTION OF THE PREFERRED EMBODIMENT

Figure 1:
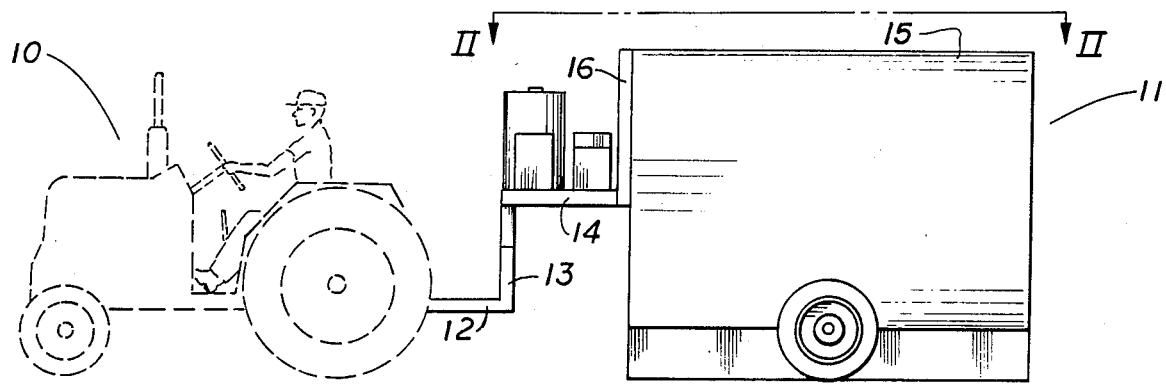
FIG. 1 is a perspective view of the pesticide spraying apparatus in accordance with the invention being towed by a conventional tractor.
Figure 2:
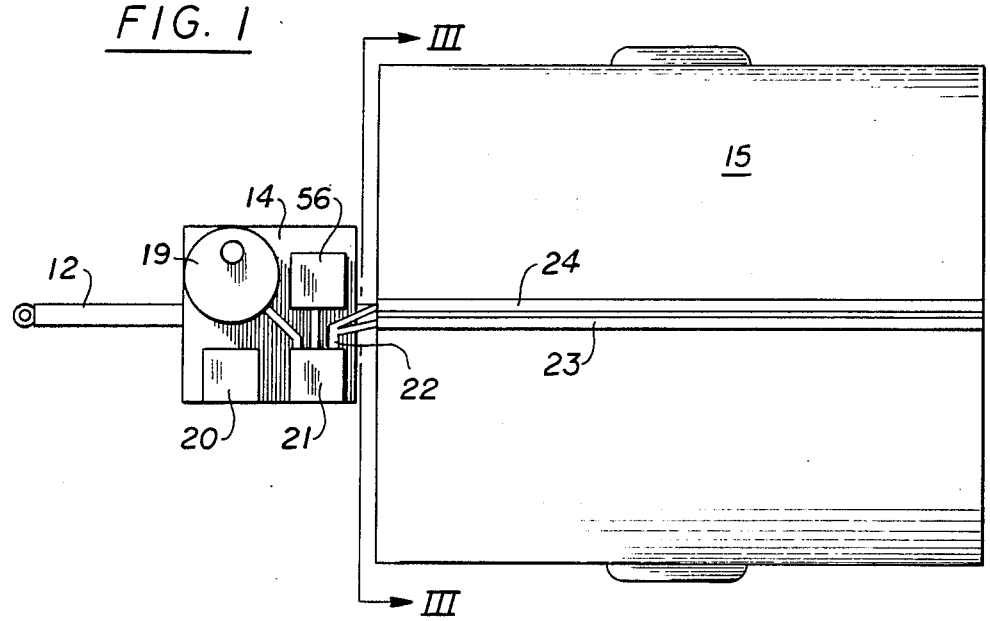
FIG. 2 is a view taken along lines II—II of FIG. 1, the tractor being removed for convenience of illustration.

Referring now to FIG. 1 of the drawing, a conventional tractor 10 is shown pulling pesticide spraying apparatus 11 in accordance with the invention. As seen in FIG. 2, apparatus 11 may include a tongue 12 for coupling the apparatus 11 to tractor 10. As seen in FIG. 1, a vertical brace 13 extends upwardly from tongue 12 to a flat platform 14 (see also FIG. 2), the platform 14 being coupled to a canopy 15 by a second vertical brace 16. Brace 16 is fixedly secured to canopy 15 in any suitable manner, such as by welding the same to braces 17, 18 (FIG. 3) which are in turn welded or otherwise secured to canopy 15. As will be discussed, braces 17, 18 may be relatively stiff yet adjustable such as being comprised of telescoping sections 80, 81 (FIG. 4) to allow the canopy halves to separate slightly and be held apart to vary the spacing at the open bottom thereof. This may be accomplished by providing aligned apertures 82 into which nuts and bolts 83 are inserted to lock the sections 80, 81 in position and thus vary the spacing at the open bottom. If this adjustability feature is desired, braces 17 and 18 would have to be pivotally mounted as is readily recognized and understood.

Referring again to FIG. 1, a conventional reservoir 19 is mounted on platform 14 for holding the pesticide solution therein. A conventional sprayer and motor 20 is also mounted on platform 14 coupled to a conventional blower 21 having a conduit 22 coupled to a pair of elongated conduits 23, 24 extending along the top inside of canopy 15.

Although a single conduit 23 or 24 may be used, and would be used if canopy 15 was one integral arcuate shaped canopy, it may be desirable to have the spacing, "x", (FIG. 4) between the open bottom edges of canopy 15 be adjustable to provide for different width beds.

Figure 4:
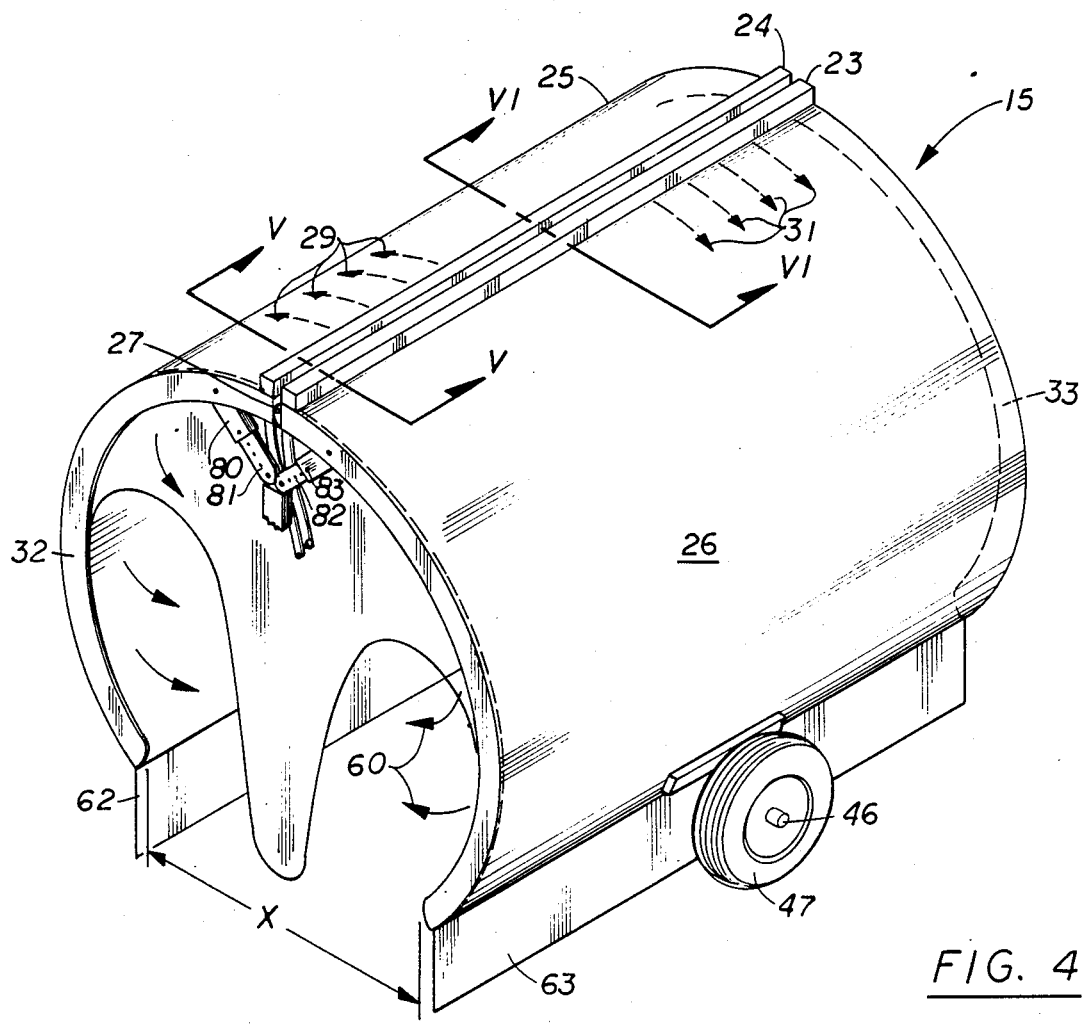
FIG. 4 is a perspective view of the canopy of FIGS. 1 to 3 illustrating schematically the distribution of the air paths therethrough.
Figure 5:
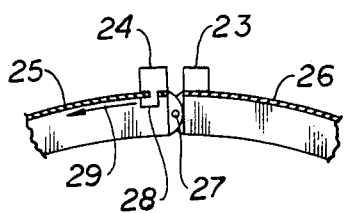
FIG. 5 and 6 are views taken along lines V—V and VI—VI, respectively, of FIG. 4.

Thus, as seen in FIG. 4, canopy 15 may be comprised of two elongated arcuate sections 25, 26 hingedly connected along hinge 27 (see also FIG. 5). As seen in FIG. 5, conduit 24 has a nozzle 28 adapted to spray droplets along the arcuate interior of section 25. As seen in FIG.

Figure 6:
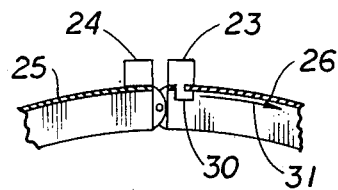

4, the arrows 29 indicate the direction of pesticide flow out of conduit 24 at spaced locations along substantially the first half of the overall length of canopy 15. That is, a plurality of nozzles 28 are provided at spaced locations along the interior of canopy 15 to about the middle thereof. As seen in FIG. 6, like nozzles 30 fluidly communicate with conduit 23 at spaced locations along substantially the rear half of canopy 15 spraying droplets in the direction of arrows 31 (see also FIG. 4). It is believed that the air or droplets spray first in one direction, then in another about the inner arcuate wall of canopy 15.

Figure 3:
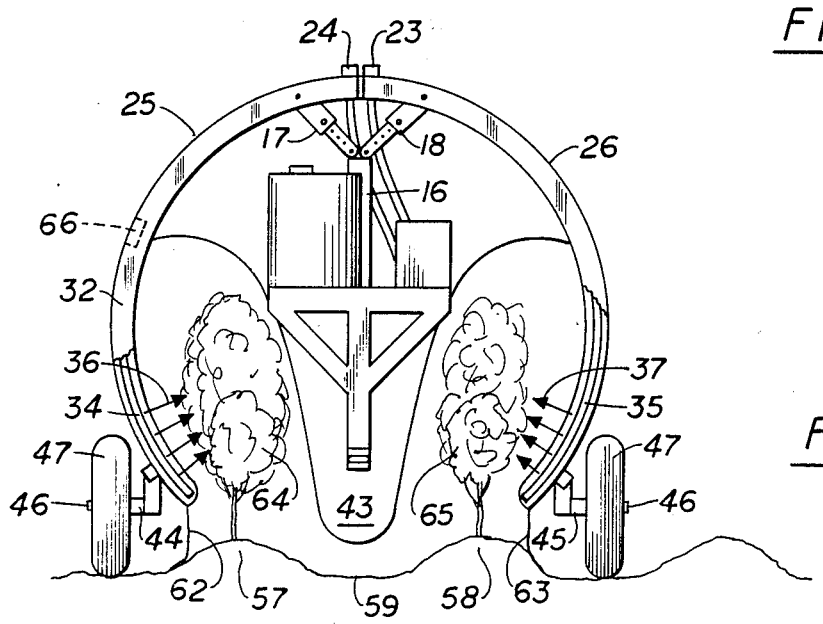
FIG. 3 is a view, partly in section, taken along lines III—III of FIG. 2.
Figure 7:
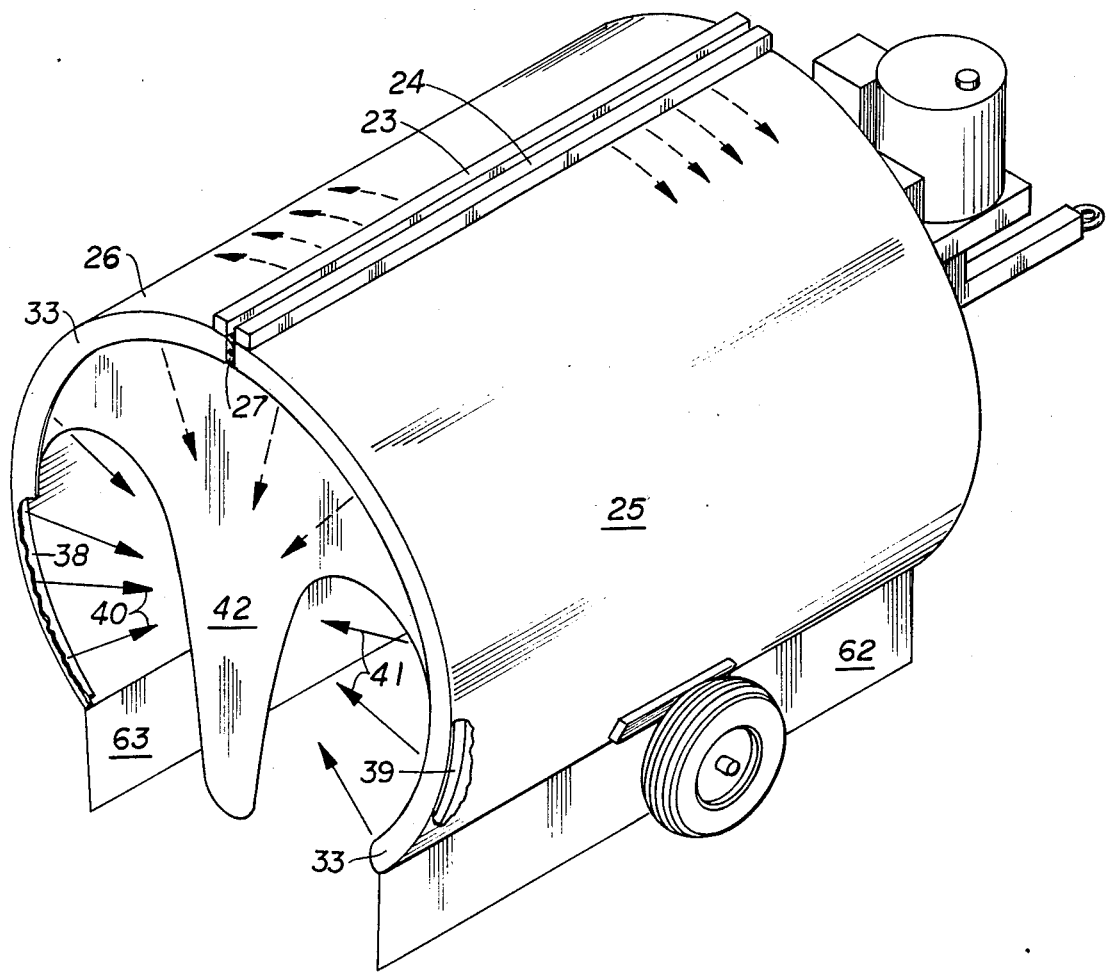
FIG. 7 is a rear perspective view of the canopy along (similar to FIG. 4) and partly in section and partly diagrammatic illustrating the distribution of air.

As seen in FIG. 3, a peripheral flange 32 is provided at the front open end of each half 25, 26 of canopy 15 and a like peripheral flange 33 (see FIG. 7 and the dashed lines in FIG. 3) is provided at the rear open end of each half of canopy 15. Also as seen in FIG. 3, arcuate conduits 34, 35 are provided at the front open end of canopy 15 having apertures for spraying air or droplets in the direction of arrows, 36, 27, respectively. This creates an air door at the front open end. The air door may be augmented by a flap 43 secured behind flange 32 on each half 25, 26 of canopy 15. Flap 43 is optional and may be of any suitable material, such as a flexible tarp material.

It is to be understood that conduits 34, 35 are in fluid communication with conduits 24, 23, respectively. An air door is also provided at the rear open end of canopy 15 in like manner. Thus, conduits 38, 39 are provided forward of flange 33 fluidly communicating with conduits 23, 24, respectively, and emitting fluid, air or spray in the direction of arrows 40, 41, respectively. A flap 42, similar to flap 43, may also be provided.

L-shaped flanges 44, 45 (FIG. 3) are welded or otherwise secured to the exterior of canopy 15 sections 25, 26 having axles 46 on which wheels 47 rotate. The apparatus 11 will be more easily maneuverable with only a single wheel 47 on each side of canopy 15 at generally the midpoint. However, obviously more than one wheel assembly may be provided.

Figure 8:
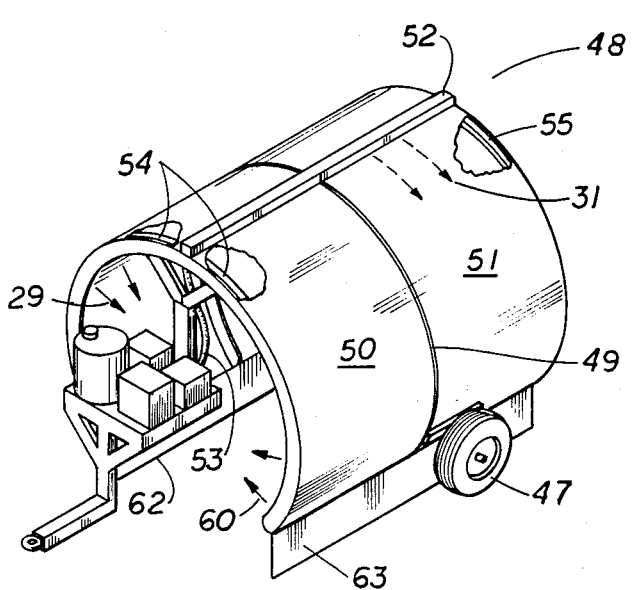
FIG. 8 is a view similar to FIG. 4, partly in section, showing an alternate embodiment of the invention.

Also, the sections 25, 26 may each be a single elongated arcuate section or comprised of a plurality of interconnected arcuate sections. This can be seen in FIG. 8 wherein like numerals refer to like parts of FIG. 4 and show an alternate canopy arrangement. Thus, instead of a single elongated canopy, canopy 48 may be comprised of arcuate sections 50, 51 interconnected by interconnecting flange or band 49. Note that each section 50 and 51 is a unitary section and not made up of hinged sections. In this type of arrangement, only a single conduit 52 is needed since it is not necessary to split the sections 50, 51. That is, air blown in at inlet 53 enters conduit 52 and fluidly interconnected front and rear conduits 54, 55 and sprays droplets inside of canopy 48 through air nozzles as heretofore described with respect to FIGS. 1 to 7.

An electrostatic charge, if desired, can be imparted to the droplets. Thus, as seen in FIG. 2, an electrostatic charging unit 56 may be provided on top of platform 14 coupled to blower 21 for applying an electrostatic charge to the droplets.

Referring now to FIG. 1, in operation, apparatus 11 is coupled to tractor 10 and towed to the area to be treated. As seen in FIG. 3, the canopy 15 straddles mounds 57, 58 of a plant bed 59, which mounds may be 40 inches or so apart. Thus, the spacing "x" (FIG. 4) is also at least 40 inches wide. Since the wheels should run in a furrow and the canopy must clear the plants the spacing "x" thereby requiring that "x" be greater than 40 inches. As heretofore discussed, if this spacing between mounds is greater, sections 25, 26 can be moved via hinge 27 to widen spacing "x". Of course, the canopy 48 of FIG. 8 cannot be widened. Flap 43 is optional and may or may not be used. The wheels 47 straddle the outside of bed 59 on both sides thereof. No interfering parts that may inhibit air flow extend into the canopy interior.

The blower 21 and sprayer and motor 20 are now activated to draw pesticide out of reservoir 19 (and a electrostatic charge may be applied via unit 56, if desired) and the air-pesticide mixture in the form of droplets is blown into conduits 23, 24, 34, 35, 38 and 39 as heretofore discussed and out of nozzles 28, 30 and the apertures in conduits 34, 35, 38 and 39 in the direction of arrows 29, 31 and arrows 36, 37 and 41, 40 at the front and rear doors, respectively.

In order to confine the pesticides to the interior of canopy 15, in addition to the front and rear air doors, flexible skirts 62, 63 may be provided along each bottom side of canopy 15 as seen in FIGS. 3, 4, 7 and 8.

The foregoing results in a confinement of the plants, such as plants 64, 65, being treated, first one side via nozzles 28, then the other side via nozzles 30 as the apparatus 11 is towed via tractor 10.

Any suitable materials may be used, such as fiberglass or molded plastic for the canopies 15 and 48 as long as no impedance of air internally thereof takes place. Such parts of the canopies 15 and 48 may be integral molded pieces, or suitable framework may be used with fiberglass or plastic or the like secured to the framework. Metal or suitable plastic may be used for any necessary framework, platform, tongue, etc. The wheels 47 may be rubber. Canvas or plastic may be used for the flaps and skirts. Conventional PVC piping may be used for the various conduits.

Any suitable equipment may be used, such as a sprayer and motor and nozzle that produces very small droplets, e.g., about 1 to 20 microns in diameter. Blower 21 should be of sufficient volume to create the two internal vortices desired, the two air doors, and keep the air moving to give the droplets and dust particles sufficient impingement velocity. A suitable blower is manufactured and sold by VWR Scientific of San Francisco, Calif., Micro-Gen Equipment Corp. of San Antonio, Tex. manufactures and sells spraying equipment that can be used.

A conventional sensor 66 (FIG. 3) may be provided on the inner wall of canopy 15 to shut the motor 20 off when the internal droplet cloud reaches a predetermined density. Since plants are positively charged, electrostatically charging the droplets negatively will result in a stronger attraction. A computer may be used to determine the number of droplets produced so as to regulate the number and size thereof. Balance posts may be used at the front and rear of apparatus 11 to balance the same when disconnected from tractor 10. The skirts may be detachable as may be the flaps for easy transport.

Any suitable dimensions may be used. For example, the canopies may be 72 inches to 80 inches in both height and width, about 180 inches more or less in the curvature of the curved semicircular sides, and about 72 inches to 96 inches long. If elongated sections of canopies are used as in canopy 48, each section may be about 48 inches long. The reservoir 19 may be a 25 gallon reservoir. Of course, these dimensions may be varied to fit different crops, row widths, etc. Flanges 32, 33 may be about 4 inches wide. Although nozzles 28, 30 have been disclosed, any suitable holes may be used. The apertures in the air door conduits may also be simple holes or veined, if desired, to direct the air flow.

It can be seen that I have disclosed a sprayer that uses minimal amount of pesticides giving total coverage of crops with little loss of spray to the soil, air or apparatus itself. I prefer to use droplets of about 10 to 20 microns in diameter since this size droplet is highly efficient in travelling over, around and under structures while retaining the required impingement velocity and carrying sufficient pesticide concentrations. This size droplet also penetrates tight grape clusters where pathogenic fungi inhabit and may be the only chemical control agents capable of such penetration. Insecticides, fungicides, bactericides, foliar nutrients, growth regulators and herbicides can be applied using the sprayer disclosed herein. Total plant surface coating may result in the efficient elimination of phytophagous or pathogenic pests while producing minimal environmental pollution.

The dual vortex or reversed direction of spray between the front and rear half of the canopy ensures that the opposite sides of the plants being sprayed are completely treated with the spray. The front and rear flanges, skirts and air doors prevent loss of spray droplets and confine the same to the interior of the canopy.

The droplets may be electrostatically charged to achieve maximum impingement of droplets on the plants using less water and pesticides.

Figure 9:
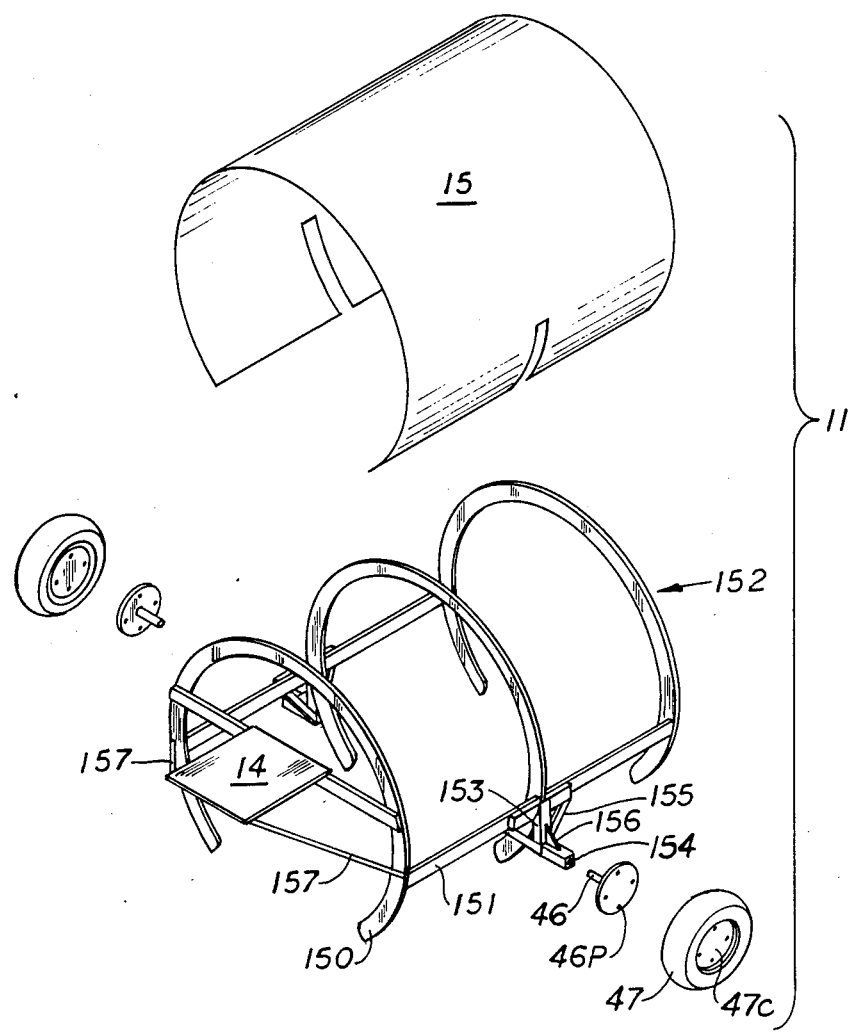
FIG. 9 is an exploded view of the apparatus of FIG. 1, to show details of the construction thereof.

The apparatus is light in weight and low in operating costs. Although I have described a particular embodiment of the invention, various modifications thereof may occur to one skilled in the art and the invention herein is to be limited only by the appended claims. Therefore, the following recited details on a typical construction of the conestoga sprayer of this invention. Needless to say it well within the skill of the art to utilize other formats than the shown in FIG. 9. Turning now to FIG. 9 we see that three flat plates such as of steel approximately ¼ inch thick by about 2 inches and approximately 180 inches long are bent under heat to form curved hoop plates 150. Square tubing 151, is secured on each side of the trio of spaced curved plates, to form a superstructure 152. The square tubing 151 may be placed approximately 2' in elevation from the lower end of each of the circular hoop plates 150. Disposed vertically from each square tube 151 is a vertical member 153 which may be welded or otherwise attached to square tube 151. A vertical member is disposed on each of the 151 square tubes. A tubular axle holder 154 is disposed outwardly from each of the vertical members. Angle braces 155 is angularly disposed on each from a suitable location on the vertical member 153 to the square tube 151 to provide rigidity. The axle holder 154 is supported by an axle brace gusset 156 which is mounted at the distal end thereof to a suitable location on the vertical member 153. Stub axle 46 mounts within the axle holder in the manner aforementioned. Stub axle 46 includes an axle plate 46P which secures to wheel 47 at its central mount section 47C in conventional fashion. Platform 14 may be braced by any type of suitable bracing such as the platform braces 157 shown herein.

Figure 10:
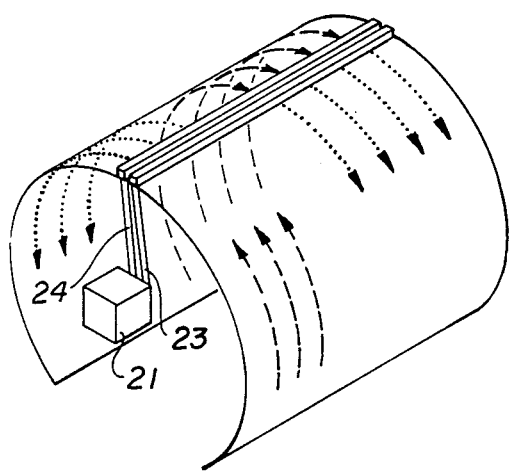
FIG. 10 and 11 are diagrammatic illustrations of the air flow of this invention.
Figure 11:
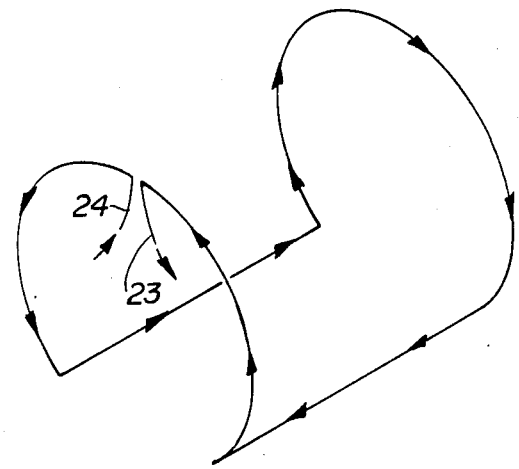

Turning now to FIGS. 10 and 11 which depict the air flow within the sprayer of this invention. As is seen in FIG. 10, air is pumped into inlet 23 from the blower 21 which is mounted on the platform as previously discussed. The inlet air is shown by the dotted line arrows as it descends downwardly into the body of the conestoga sprayer. Return air is directed toward the blower, and is shown by the dashed lines. Thus the openings in the inlet duct circulate the air in a counterclockwise direction in the front half of the sprayer unit and clockwise as is seen in the rear half thereof. Air is picked up by the blower inlet and returned to the blower for recirculation, in a dual direction manner as is seen with the counterclockwise arrows being at the front and the clockwise arrows being at the rear.

In FIG. 11, the air duct (air current) door system that is disposed within the confines of the conestoga sprayer is shown. Plastic tubing such as PVC is suitably connected in conventional manner in a construction of the configuration shown in FIG. 11. The direction of the airflow follows the arrows. The air current is disposed along the periphery of the sprayer to provide a thin sheet or curtain of air for the purpose of keeping small spray droplets contained and confined within the inside of this invention. The blower provides air for the tube and slits along the tube provide the current of air between the sprayer and the soil surface and between the forward sides and rearward sides of the apparatus. It is seen therefore that the blower(s) utilized herein serve to provide air for both circulation and the air curtain. Suitable blowers have been aforementioned.

Since certain changes may be made in the above apparatus without departing from the scope of the invention herein involved, it is intended that all matter contained in the above description and shown in the accompanying drawings shall be interpreted as illustrative and not in a limiting sense.

I claim:

1. In the apparatus for spraying pesticides or the like comprising:
    an arcuately configured canopy open at each end forming a front door and rear door and having a substantially imperforate arcuate inner wall and open along the bottom thereof;
    roller means on the exterior of said canopy for rolling the same along a horizontal surface; and
    fluid conduit means extending along the upper portion of said inner wall having a plurality of apertures therealong for directing fluid arcuately along said inner arcuate wall, said fluid conduit means also opening along the interior of both said front and rear doors and directing fluid in a direction generally parallel to the plane of said front and rear doors to provide "air doors" thereat
    wherein said fluid conduit means includes first fluid directing means for directing fluid in a first direction from said front door to generally the middle of said canopy generally parallel to the curve of said arcuate inner wall and second fluid directing means for directing fluid in a second direction from generally the middle of said canopy to said rear door generally parallel to the curve of said arcuate inner wall opposite that of said first directing means.

2. In the apparatus of claim 1 wherein each of said first and rear doors are circumscribed by peripheral flanges, said fluid conduit means at said front and rear doors being disposed behind said respective flanges.

3. In the apparatus of claim 1 wherein said roller means includes a single pair of rotatable wheels at the bottom of the exterior of said canopy at about the middle thereof with all parts thereof confined to the exterior of said canopy.

4. In the apparatus of claim 1 including a platform fixedly secured to said canopy having a tongue for coupling said canopy to a tractor, and a motor actuated sprayer coupled to a blower and a reservoir mounted on said platform, said blower being coupled to said fluid conduit means.

5. In the apparatus of claim 4 including electrostatic charging means mounted on said platform coupled to said sprayer for applying an electrostatic charge to fluids emitted from said sprayer.

6. In the apparatus of claim 1 including a flexible downwardly extending skirt extending along the longitudinal bottom of the outside of said canopy on each side thereof.

7. In the apparatus of claim 1 including a flexible flap closing off at least a portion of the openings forming said front and rear doors.

8. In the apparatus of claim 1 wherein the spacing at said opening along the bottom of said canopy is about 40 inches.

9. In the apparatus of claim 1 wherein said canopy is comprised of two interconnected arcuate sections hingedly connected along the top thereof so as to selectively vary the spacing between said open bottom.

10. In the apparatus of claim 1 wherein said canopy is comprised of a pair of longitudinally extending interconnected arcuate sections.

* * * * *